United States Patent [19]

Lovely et al.

[11] Patent Number: 5,091,774
[45] Date of Patent: Feb. 25, 1992

[54] METHOD AND APPARATUS FOR PROVIDING SYNC ON R-G-B VIDEO SIGNALS

[75] Inventors: John D. Lovely, Batavia; Christopher M. Downs, Canandaguia, both of N.Y.

[73] Assignee: Eastman Kodak Company, Rochester, N.Y.

[21] Appl. No.: 620,023

[22] Filed: Nov. 30, 1990

[51] Int. Cl.$^5$ ............... H04N 9/44; H04N 9/64
[52] U.S. Cl. .................................. 358/17; 358/27
[58] Field of Search ................ 358/17, 27, 148

[56] References Cited

U.S. PATENT DOCUMENTS

| | | | |
|---|---|---|---|
| 3,787,611 | 1/1974 | Poetsch et al. | 358/27 |
| 4,030,120 | 6/1977 | Pham Van Cang | 358/27 |
| 4,148,070 | 4/1979 | Taylor | 358/160 |
| 4,228,456 | 10/1980 | Lovely . | |
| 4,466,122 | 8/1984 | Auerbach . | |
| 4,467,357 | 8/1984 | Canton | 358/148 |
| 4,604,646 | 8/1986 | Karlock . | |
| 4,614,973 | 9/1986 | Sorenson . | |
| 4,709,258 | 11/1987 | Salzer | 358/27 |
| 4,772,950 | 9/1988 | Furuhata et al. | 358/148 |
| 4,780,769 | 10/1988 | Numakura et al. | 358/320 |
| 4,894,719 | 1/1990 | Moon | 358/148 |
| 4,954,880 | 9/1990 | Tanimizu | 358/17 |

*Primary Examiner*—Howard W. Britton
*Assistant Examiner*—Wendy R. Greening
*Attorney, Agent, or Firm*—Parkhurst, Wendel & Rossi

[57] ABSTRACT

A method and apparatus for detecting the presence of a synchronization signal in at least one of a red, green and blue video input signal is disclosed, that permits signal processing to occur on the red, green and blue video input signals after the synchronization signal has been removed therefrom, while providing a reconstituted synchronization signal that is combined with the red, green and blue video signals after the completion of the signal processing.

9 Claims, 2 Drawing Sheets

METHOD AND APPARATUS FOR PROVIDING SYNC ON R-G-B VIDEO SIGNALS

TECHNICAL FIELD

The present invention relates in general to video signal processing circuits. In particular, the present invention relates to a method and apparatus for detecting the presence of a synchronization signal or pulse within at least one of a red (R), green (G) or blue (B) video input signals prior to signal processing and providing the synchronization pulses in a video output signal after signal processing.

BACKGROUND

It is a common practice to combine a synchronization signal or pulse with one or more component R-G-B video signals. Generally, the synchronization pulse is provided either within the green video signal alone (i.e. sync on green) or within all three video signals (i.e. sync on R-G-B). Alternatively, a synchronization pulse separate from the component R-G-B video signals may be employed.

In many video signal processing systems, however, the synchronization pulse must be removed or stripped from the incoming R-G-B video signals before the R-G-B video signals can be processed by various signal processing circuits. The synchronization pulse must then be reinserted into or combined with the appropriate R-G-B video signals after signal processing is complete. For example, it is desirable to remove the synchronization pulse prior to storing representations of the R-G-B video signals within a framestore and to restore a reconstituted synchronization pulse to the R-G-B video signals for further processing.

In view of the different types of synchronization that may be employed in various video signal applications, it would be desirable to provide a general video signal processing system that was capable of processing video signals containing all of the different types of synchronization formats. Accordingly, a general video signal processing system would require a method and apparatus for automatically detecting the presence of a synchronization pulse within one or more of the R-G-B video signals prior to signal processing and providing the synchronization pulse within the respective R-G-B video signals after signal processing was complete. The provision of such an apparatus is an object of the present invention as will be described in greater detail below.

SUMMARY OF THE INVENTION

The present invention provides a method and apparatus for detecting the presence of a synchronization signal within at least one of a red, green or blue video input signal prior to signal processing and providing a reconstituted synchronization signal in a video output signal after signal processing.

More specifically, an apparatus for providing a synchronization signal on R-G-B video signals is provided that includes red, green and blue sync stripper circuits coupled to red, green and blue input video signal lines, at least one sync detector circuit coupled to at least one of the red, green and blue sync stripper circuits, at least one sync amplifier circuit coupled to the sync detector circuit, wherein the sync amplifier circuit is responsive to the detector circuit to generate a reconstituted synchronization signal when the sync detector circuit detects the presence of a synchronization signal and supply the reconstituted synchronization signal to at least one of a red, green and blue output video signal line.

In operation, red, green and blue input video signals are applied to corresponding red, green and blue input video signal lines, synchronization signals are stripped from at least one of the red, green and blue input video signals, the presence of the synchronization signals are detected within at least one of the red, green and blue input video signals, a composite synchronization signal is generated, and at least one reconstituted synchronization signal is applied to at least one of a red, green and blue video output line in response to the detection of the presence of the synchronization signals.

BRIEF DESCRIPTION OF THE DRAWINGS

With the above as background, reference should now be made to the description of the best mode for carrying out the invention provided below and the accompanying drawings in which.

BEST MODE FOR CARRYING OUT THE INVENTION

Figure 1:
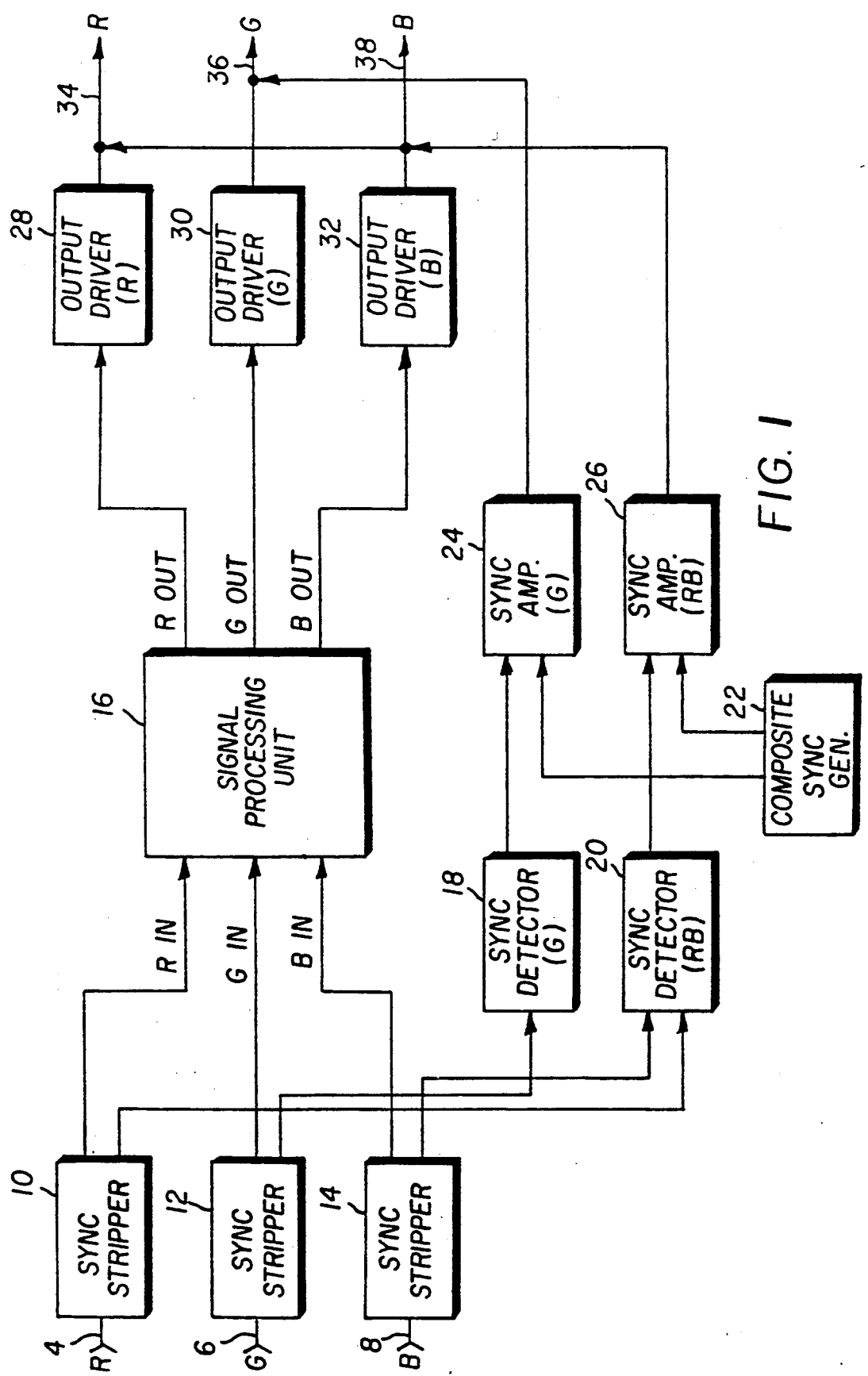
FIG. 1 is a schematic block diagram of a video signal processing system in accordance with the present invention.

Referring now to FIG. 1, a general video signal processing circuit is shown including three sync strippers 10-14 respectively coupled to R-G-B video signal input lines 4-8. The sync strippers 10-14 are of conventional design and are used to remove or strip synchronization pulses from R-G-B video signals that are applied to the R-G-B video signal input lines. The sync strippers 10-14 are also coupled to a signal processing unit 16. The signal processing unit 16 may include any type of circuit element that requires the synchronization pulses be stripped from the R-G-B signals prior to the utilization of the R-G-B signals by the signal processing unit 16. For example, the signal processing unit 16 may take the form of a framestore device. The signal processing unit 16 is further coupled to three output drivers 28-32 which correspond to R-G-B video output lines 34-38. The output drivers 28-32 are also of conventional design. It should be noted that while the output drivers 28-32 are schematically shown as separate elements they may be included within the signal processing unit 16.

As will be described in greater detail below, two sync detectors 18, 20 are provided to detect the presence of a synchronization pulse in either the green video signal applied to the green video input line 6 or the red and blue video signals applied to the red and blue video input lines 4, 8. The two sync detectors 18, 20 are respectively coupled to sync stripper 12 corresponding to the green video input line and sync strippers 10, 14 corresponding to the red and blue video input lines. The sync detectors 18, 20 respectively supply detection signals to sync amplifiers 24, 26 if a synchronization pulse is detected on either the green video input line 6 or the red and blue video input lines 4, 8. A composite sync generator 22 is also coupled to the sync amplifiers 24 and 26. The composite sync generator 22 generates synchronization pulses that are utilized by the sync amplifiers 24 and 26 to generate synchronization pulses that are selectively supplied, based on whether the detection signals have been received from the sync detectors 18, 20, to the R-G-B video output lines 34-38.

The method of operation of the system disclosed in FIG. 1 will now be described in greater detail. Input R-G-B video signals are applied to the R-G-B input video lines 4-8. Using the conventional "sync on green" or "sync on R-G-B" formats described above, a synchronization pulse is contained within either the green input video signal or all of the input video signals. The sync detector 18 detects whether a synchronization pulse is present in the green video input signal applied to the green video input line 6 and supplies a detection signal accordingly to the sync amplifier 24. The sync detector 20 detects whether synchronization pulses are present in the red and blue video input signals applied to the red and blue video input lines 4, 8 and supplies a detection signal accordingly to the sync amplifier 26. The sync amplifiers 24, 26 generate appropriate reconstituted synchronization signals if a detection signal is received from the sync detectors 18, 20. Meanwhile, the signal processing unit 16 processes the stripped R-G-B video signals supplied thereto by the sync strippers 10-14 and passes the processed R-G-B video signals to the output drivers 28-32. The output signals from the output drivers 28-32 are combined with the reconstituted synchronization signals generated by the sync amplifiers 24, 26. Thus, the output R-G-B video signals applied to the output R-G-B video signal lines 34-38 reflect the same synchronization format as the input R-G-B signals applied to the input R-G-B video signal lines 4-8. In other words, a synchronization signal is provided in the green output video signal if a synchronization signal is present in the green input video signal and synchronization signals are provided in all of the output video signals if synchronization signals are present in all of the input video signals.

Figure 2:
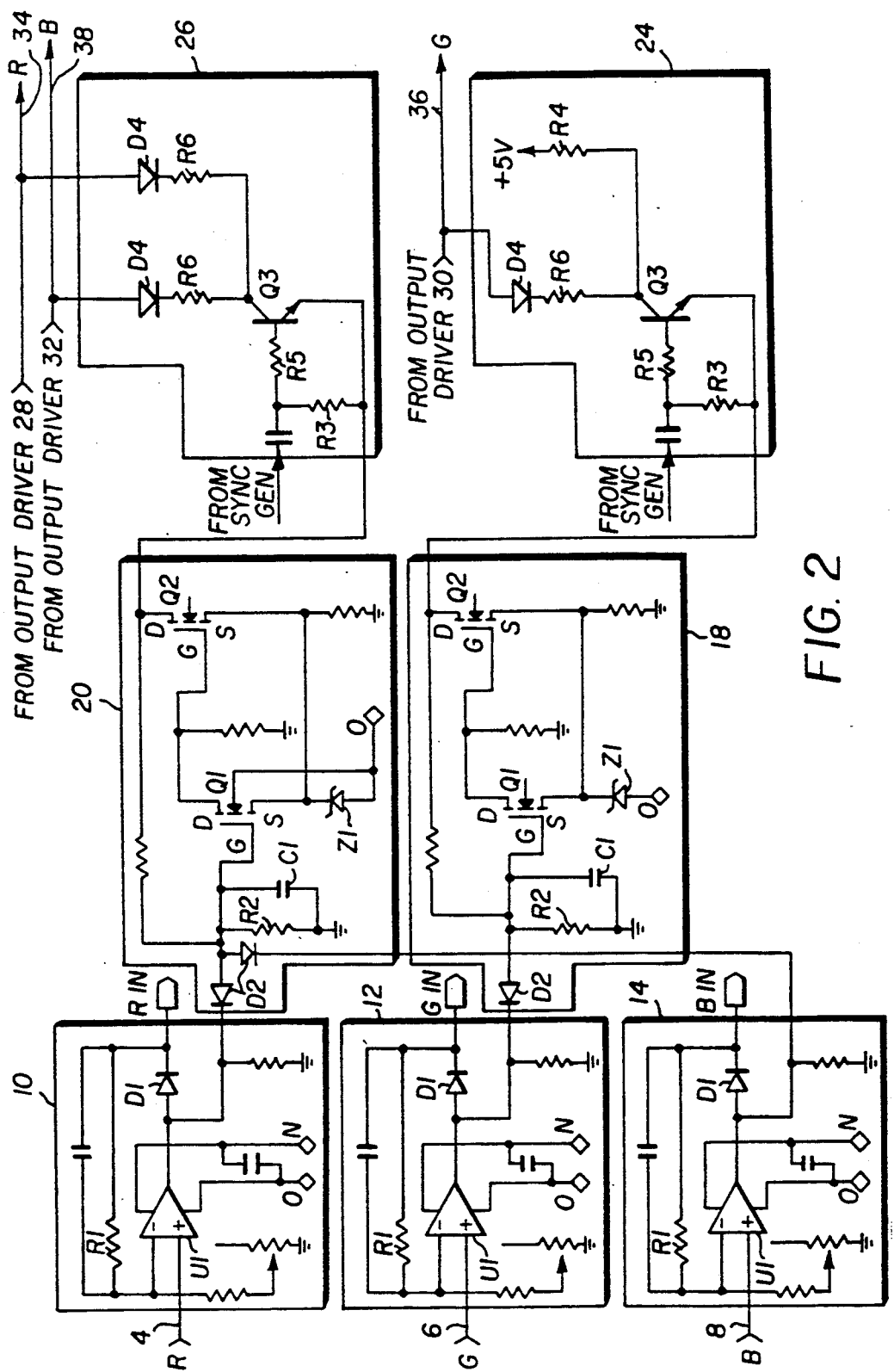
FIG. 2 is a detailed schematic diagram of the sync strippers, sync detectors, and sync amplifiers illustrated in the schematic block diagram of FIG. 1.

A detailed schematic diagram of the sync strippers 10-14 and sync detectors 18, 20 is shown in FIG. 2. A detailed explanation of the sync stripper 12 and sync detector 18 associated with the green input video signal will be provided. It will be understood that the other sync strippers 10, 14 and the sync detector 20 operate in the same manner. Sync stripper 12 is of conventional design. The input signal to the sync stripper 12 is black level clamped to ground so that sync pulses extend below ground potential. The output of amplifier U1 goes to the negative supply if any synchronization signal (negative pulse) is present on the input line 6. This occurs because the synchronization pulse at the output of U1 will cause diode D1 to become essentially open, thereby removing the feedback resistor R1 from the circuit and causing U1 to operate in an open loop gain mode. Thus, any incoming synchronization pulse will cause the output of U1 to drop to the negative supply voltage. Positive video signals, in contrast, will cause diode D1 to conduct thereby making the feedback operative.

Referring now to the sync detector 18, an FET Q1 is kept in a conducting state without the presence of a synchronization pulse as resistor R2 maintains capacitor C1 in a discharged state. The drain of Q1, and the gate of an FET Q2 coupled thereto, will then be close to the Zener voltage of diode Z1, thereby holding Q2 in a non-conducting state. It is noted that Q1 and Q2 are preferably enhancement type FETs. When output of U1 goes negative as a result of the presence of a synchronization pulse, the diode D2 of the sync detector 18 conducts which in turn causes capacitor C1 to charge to within a volt or two of the negative supply. The charge on capacitor C1 causes Q1 to cut off which in turn causes Q2 to conduct when a synchronization pulse is present.

The drain of Q2 is coupled to a resistor R3 and the emitter of a transistor Q3 of the sync amplifier circuit 24. Q3 cannot conduct when Q2 is in a non-conducting state. The collector of Q3 is held at +5 volts by resistor R4. The cathode of a diode D4 coupled to the collector will therefore be held at a higher potential than the anode of the diode, thereby preventing the diode D4 from conducting. In essence, the sync amplifier 26 is decoupled from the output video signal line 36. When Q2 becomes conductive, however, Q3 is allowed to saturate when synchronization pulses, generated by the composite sync generator 22, are applied to base of Q3. A resistor R5 is provided to limit the base current during positive synchronization pulses. Diode D4 conducts as Q3 saturates thereby allowing the negative synchronization pulse to be added to the output signal from the output driver 30 on output video signal line 36. The amplitude or amount of synchronization pulse added to the output signal is controlled by a resistor R6.

As noted above, the operation of the sync detector 20 is identical to the operation of the sync detector 18. Common elements are denoted by the same reference designations in FIG. 2. The only difference is that the sync detector 18 has two sync detection diodes D2, one coupled to the red sync stripper 10 and one coupled to the blue sync stripper 14. The two detection diodes are commonly connected to capacitor C1. Thus, the sync detector 20 detects whether a synchronization pulse is present on both the red and blue video input lines.

The operation of the sync amplifier 26 is also identical to the operation of the sync amplifier 24. Common elements are denoted by the same reference designations in FIG. 2. The only difference is that the sync amplifier 24 includes two diodes D4 connected to the collector of the transistor Q3. The two diodes D4 are respectively coupled to the red and blue video output lines 34, 38. The operation of the sync detectors 18, 20 and sync amplifiers 24, 26 as described above insures that the output R-G-B video signals from the general signal processing circuit illustrated in FIG. 1 will contain the same synchronization format, i.e., sync on green etc., as the input R-G-B video signals supplied thereto.

It will be understood that the present invention has been described with reference to certain preferred embodiments thereof and that modifications and variations are possible within the scope of the appended claims. For example, separate sync detectors and sync amplifiers could be provided to independently detect synchronization signals on the red and blue video input lines. Different circuitry may also be employed to accomplished the functions performed by the sync detectors and sync amplifiers. In addition, while the composite synchronization signal has been illustrated as generated from a separate sync generator, the composite sync generator may comprise circuitry for processing and delaying the sync signal contained within the red, green and blue input video signals to provide the composite sync signal.

What is claimed is:

1. An apparatus for providing a synchronization signal on R-G-B video signals comprising:
 red, green and blue sync stripper circuits coupled to red, green and blue input video signal lines;

at least one sync detector circuit coupled to at least one of said red, green and blue sync stripper circuits, wherein said sync detection circuit includes a first FET transistor having a gate coupled to said sync stripper circuit, a source coupled to a Zener diode, and a drain coupled to a the gate of a second FET transistor circuit;

at least one sync amplifier circuit coupled to said sync detector circuit, wherein said amplifier circuit is responsive to said sync detector circuit to generate a reconstituted synchronization signal when said sync detector circuit detects the presence of a synchronization signal and supplies said reconstituted synchronization signal to at least one of a red, green and blue output video signal line.

2. An apparatus for providing a synchronization, signal on R-G-B video signals as claimed in claim 1, further comprising: a signal processing unit coupled to said red, green and blue sync stripper circuits and to said red, green and blue output video signal lines.

3. An apparatus for providing a synchronization signal on R-G-B video signals as claimed in claim 1, further comprising: a sync generator circuit coupled to said sync amplifier circuit.

4. An apparatus for providing a synchronization signal on R-G-B video signals as claimed in claim 3, wherein said sync generator circuit generates a composite synchronization signal that is supplied to said sync amplifier circuit and said sync amplifier circuit is responsive to said composite synchronization signal to generate said reconstituted synchronization signal.

5. An apparatus for providing a synchronization signal on R-G-B video signals as claimed in claim 1, wherein said gate of said first FET transistor is coupled to said sync stripper circuit via a sync detection diode.

6. An apparatus for providing a synchronization signal on R-G-B video signals as claimed in claim 5, wherein said first FET transistor is rendered conductive and said second FET transistor is rendered non-conductive when said synchronization signal is not present and said first FET is rendered non-conductive and said second FET transistor is rendered conductive when said synchronization signal is present.

7. An apparatus for providing a synchronization signal on R-G-B video signals as claimed in claim 1, wherein said sync amplifier includes a bipolar transistor having an emitter coupled to the drain of said second FET transistor, a base coupled to a sync generator, and a collector selectively coupled to at least one of said red, green and blue output video signal lines.

8. An apparatus for providing a synchronization signal on R-G-B video signals as claimed in claim 7, wherein said sync amplifier applies a reconstituted synchronization signal to the output video signal line coupled to said collector when said second FET transistor is conductive and a composite synchronization signal is applied to said base by said sync generator.

9. An apparatus for providing a synchronization signal on R-G-B video signals comprising:
first, second and third sync stripper circuits respectively coupled to red, green and blue input video signal lines;
a first sync detector circuit coupled to said second sync stripper circuit and a second sync detector circuit coupled to said first and third sync stripper circuits;
a signal processing unit coupled to said first, second and third sync stripper circuits;
first, second and third output driver circuits respectively coupled to red, green and blue output video signal lines and said signal processing unit;
a sync generator circuit;
a first sync amplifier including signal inputs coupled to said first sync detector circuit and said sync generator circuit and a signal output coupled to said green output video signal line; and
a second sync amplifier circuit including signal inputs coupled to said second sync detector circuit and said sync generator circuit and a signal output coupled to said red and blue output video signal lines.

* * * * *